United States Patent
Kandori et al.

(10) Patent No.: US 8,345,339 B2
(45) Date of Patent: Jan. 1, 2013

(54) OPTICAL DEFLECTOR

(75) Inventors: Atsushi Kandori, Ebina (JP); Masao Majima, Isehara (JP); Kazunari Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 12/137,998

(22) Filed: Jun. 12, 2008

(65) Prior Publication Data
US 2008/0316560 A1 Dec. 25, 2008

(30) Foreign Application Priority Data

Jun. 21, 2007 (JP) ................................. 2007-163235
Apr. 18, 2008 (JP) ................................. 2008-108614

(51) Int. Cl.
*G02B 26/10* (2006.01)
(52) U.S. Cl. ...................... 359/224.1; 359/904; 250/234
(58) Field of Classification Search .... 359/196.1–226.3; 250/234–236; 358/474, 493–494; 347/243, 347/259–260
See application file for complete search history.

(56) References Cited

U.S. PATENT DOCUMENTS

| | | | |
|---|---|---|---|
| 5,247,384 A | 9/1993 | Inoue et al. | |
| 5,552,919 A | 9/1996 | Majima et al. | |
| 5,594,577 A | 1/1997 | Majima et al. | |
| 5,606,447 A | 2/1997 | Asada et al. | 359/199 |
| 5,654,814 A | 8/1997 | Ouchi et al. | |
| 5,774,243 A | 6/1998 | Majima | |
| 5,886,802 A | 3/1999 | Majima | |
| 6,101,014 A | 8/2000 | Majima | |
| 6,104,516 A | 8/2000 | Majima | |
| 6,188,499 B1 | 2/2001 | Majima | |
| 2004/0240017 A1 | 12/2004 | Kandori et al. | 359/196 |
| 2005/0128546 A1 | 6/2005 | Kandori et al. | |
| 2007/0035799 A1* | 2/2007 | Gomi et al. | 359/214 |
| 2007/0103752 A1 | 5/2007 | Kandori et al. | |
| 2007/0182419 A1 | 8/2007 | Ushijima et al. | |
| 2008/0043295 A1 | 2/2008 | Sakakibara | |

FOREIGN PATENT DOCUMENTS

JP 3-154019 A 7/1991
(Continued)

OTHER PUBLICATIONS

Merrian-Webster's Collegiate Dictionary 270 (11th ed 2003).*

*Primary Examiner* — Jennifer L. Doak
(74) *Attorney, Agent, or Firm* — Fitzpatrick, Cella, Harper & Scinto

(57) ABSTRACT

The optical deflector includes a deflector, a vibration detector, a driving signal generator, a modulation timing signal generator, and a deflection detector. The deflector has a vibrational system having a movable body with a light deflecting member, and deflects light from a light source by the movable body. The vibration detector detects the vibration condition of the vibrational system of the deflector. The driving signal generator generates a driving signal for driving the vibrational system of the deflector. The modulation timing signal generator generates a modulation timing signal as the reference time for regulating the amount of light from the light source. The deflection detector detects the deflection condition of light deflected by the deflector. The driving signal generator generates the driving signal based on information of the vibration condition detected by the vibration detector, and the modulation timing signal generator generates the modulation timing signal based on information of the deflection condition detected by the deflection detector.

10 Claims, 8 Drawing Sheets

FOREIGN PATENT DOCUMENTS

| | | |
|---|---|---|
| JP | 7-175005 | 7/1995 |
| JP | 2001-021829 A | 1/2001 |
| JP | 2001-305471 | 10/2001 |
| JP | 2003-043403 A | 2/2003 |
| JP | 2004-264670 A | 9/2004 |
| JP | 2005-115067 | 4/2005 |
| JP | 2006-276634 A | 10/2006 |
| JP | 2007-98872 | 4/2007 |

* cited by examiner

OPTICAL DEFLECTOR

BACKGROUND OF THE INVENTION

1. Field of the Invention

The present invention relates to an optical deflector that includes a deflector provided with a vibrational system having a movable body with a light deflecting member, and deflects light from a light source by the movable body. Further, the present invention relates to an image forming apparatus using the optical deflector.

2. Description of the Related Art

As a conventional optical deflector, a galvano-mirror as illustrated in FIG. 8 has been proposed. See also JP 07-175005 A. This galvano-mirror is driven with an electromagnetic force. In the galvano-mirror, a mirror 56 is provided on a movable plate 53, and the movable plate 53 is supported by a silicon substrate 50 through torsion springs 54. The movable plate 53 can be tilted about an axis defined by the torsion springs 54 in a reciprocating manner. A driver for driving the movable plate 53 is comprised of a flat coil 55 and permanent magnets 60 to 63. The optical deflector is accordingly of an electromagnetic type in which a current is caused to flow through the flat coil 55, and the Lorentz force for driving the movable plate 53 is generated due to the current flowing through the flat coil 55 and the magnetic flux generated by the magnets 60 to 63. In FIG. 8, reference numeral 51 designates an upper-side glass substrate, reference numeral 52 designates a lower-side glass substrate, and reference numeral 57 designates an electrode terminal.

As another conventional optical deflector, an actuator of the same electromagnetic type including a movable body with a reflective mirror has been proposed. See, e.g., JP 2001-305471 A. This electromagnetic actuator has been devised for overcoming the following disadvantageous phenomena. In general, the resonance frequency of an electromagnetic actuator is liable to drift due to a change in temperature, or with time. Accordingly, where a modulating current at a preset resonance frequency continues to be supplied to the flat coil, the maximum tilt angle of the movable body cannot be stably maintained for the reasons described above. In this conventional optical deflector, therefore, the electromagnetic actuator is designed to achieve an appropriate reciprocating rotation of the movable body at the resonance frequency, or an appropriate regulation of the maximum tilt angle of the movable body, without using an additional detecting portion. Further, proposed in this conventional optical deflector is a signal generator for generating a resonance frequency signal corresponding to the resonance frequency of the electromagnetic actuator.

To achieve these objects, the coil in the conventional optical deflector is used for the detector as well as for the driver for driving the movable body. For the detection, voltage or current induced in the coil is employed. Information of the time at which the actuator passes a certain tilt or deflection angle is detected based on the voltage or current induced in the coil serving as the detector.

However, where the optical deflector as disclosed in JP 2001-305471 A is used for deflecting a light beam modulated according to an image signal, there is a possibility that the temperature of the optical deflector varies depending on contents of the image signal. Thus, the motion of the light deflection fluctuates, and the quality of the image formed is likely to decrease. To improve the quality of the image, therefore, it would be helpful to correct the motion of the light deflection in accordance with a modulation rate of the image signal.

SUMMARY OF THE INVENTION

According to one aspect of the present invention, there is provided an optical deflector including a deflector, a vibration detector, a driving signal generator, a modulation timing signal (MTS) generator, and a deflection detector. The deflector is provided with a vibrational system having a movably supported body with a light deflecting member, and deflects light from a light source by the movable body. The vibration detector detects a vibration condition of the vibrational system of the deflector. The driving signal generator generates a driving signal for driving the vibrational system of the deflector. The MTS generator generates a modulation timing signal as a reference time for regulating the amount of light from the light source. The deflection detector detects a deflection condition of deflected light created by deflection of the light from the light source with the deflector. Further, the driving signal generator generates the driving signal based on information of the vibration condition detected by the vibration detector, and the MTS generator generates the modulation timing signal based on information of the deflection condition detected by the deflection detector.

According to another aspect of the present invention, there is provided an optical instrument, such as an image forming apparatus and an image displaying apparatus, including the above optical deflector of the present invention, a light source, and a target object. The optical deflector deflects light from the light source, and guides at least a portion of the light onto the target object. An image is formed on the target object with the guided light while image data for regulating the amount of light from the light source is synchronized with the modulation timing signal.

According to the present invention, the motion of the light deflection can be speedily and stably regulated since the vibration detector and the deflection detector are provided in the optical deflector. For example, the motion of the light deflection can be corrected quickly according to a changing speed of image data, and hence a highly-precise and stable optical instrument, such as an image forming apparatus and an image displaying apparatus, can be provided.

Further features of the present invention will become apparent from the following description of exemplary embodiments with reference to the attached drawings.

DESCRIPTION OF THE EMBODIMENTS

Embodiments of an optical deflector and an image forming apparatus of the present invention will hereinafter be described with reference to the drawings.

Figure 1:
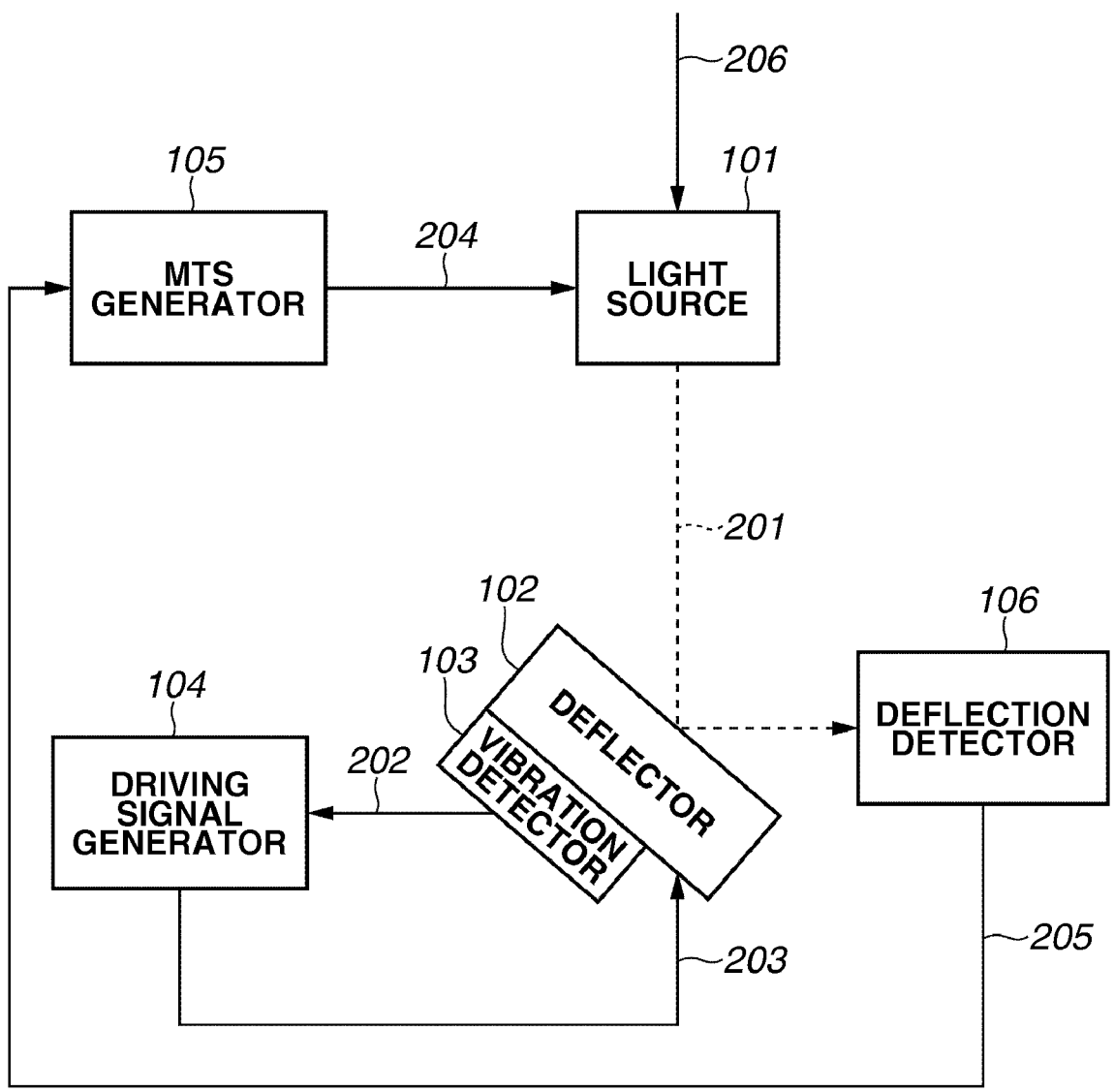
FIG. 1 is a view illustrating the setup of an optical deflector of an embodiment according to the present invention.

A first embodiment will be described. As illustrated in FIG. 1, an optical deflector of this embodiment includes a light source 101, such as a semiconductor laser. A deflector 102 is provided with a vibrational system having a rotatably supported movable body with a light deflecting member, such as a total reflection mirror, and deflects a light beam 201 from the light source 101 by the movable body. The deflector 102 has at least a characteristic vibrational mode. The deflector 102 can have plural characteristic vibrational modes, such as vibrational modes about the same axis and vibrational modes about different axes.

The optical deflector of this embodiment further includes a vibration detector 103 for detecting the vibration condition of the vibrational system of the deflector 102, a driving signal generator 104 for generating a driving signal 203 for driving the vibrational system of the deflector 102, an MTS generator 105 for generating a modulation timing signal 204 as the reference time for regulating light emission, such as the amount of emitted light, of the light source 101, and a deflection detector 106 for detecting the deflection condition of deflected light deflected by the deflector 102.

Furthermore, in FIG. 1, reference numeral 202 designates a detection signal that is information representative of the vibration condition of the deflector 102 detected by the vibration detector 103, reference numeral 205 designates a detection signal that is information representative of the deflection condition of the deflected light detected by the deflection detector 106, and reference numeral 206 designates a signal, such as an image signal, of a modulation pattern for modulating the light source 101. The construction of the deflection detector 106 will be specifically described in a third embodiment described below.

In this specification, a condition under which the vibrational system of the deflector 102 vibrates or swings is referred to as the vibration condition, and a condition under which the light beam 201 from the light source 101 is deflected by the deflector 102 and moved on a certain surface is referred to as the deflection condition.

In this embodiment, the light source 101 includes a controlling portion for regulating or modulating the amount of the light beam 201 emitted from the light source 101. For example, where the light source 101 is a semiconductor laser, the controlling portion is an electrode to which a control voltage or current is applied. As a method of regulating or modulating the amount of light emitted from the light source 101, there exist a method of changing the intensity of the light from the light source 101 in a time series manner, a method of repeating ON and OFF of the light source 101 and changing an ON-time ratio within a unit time interval, and the like. In this embodiment, the modulation pattern signal 206 for controlling a change in the amount of light from the light source 101 is input into the light source 101.

When the modulated light beam 201 from the light source 101 regulated according to the modulation pattern signal 206 is deflected and scanned by the deflector 102, an image forming apparatus can be constructed with the optical deflector. A desired light deflection can be achieved when timing of vibration of the vibrational system of the deflector 102 and timing serving as a trigger or reference for modulation of the light source 101 are appropriately regulated.

The deflector 102 can be comprised, for example, of the above conventional actuator. It is desirable to set up the deflector 102 that can achieve a desired vibrational condition when driven in a resonance mode. In such a resonance mode, the amplitude or magnitude of vibration of the vibrational system in the deflector 102 largely depends on the frequency of the driving signal 203, and the vibration is effectively excited at a predetermined frequency or resonance frequency. The deflector 102 can be driven by using the above-described conventional electromagnetic method that uses the coil and the magnet.

The deflector 102 can also be driven by using the electrostatic method or piezoelectric method. In the electrostatic method, an electrode is provided on a movable body, and another electrode for generating an electrostatic force between these two electrodes is arranged near the movable body. In the piezoelectric method, a piezoelectric element is provided in the vibrational system, a support portion therefor, or the like to apply a driving force to the deflector.

Figure 2A:
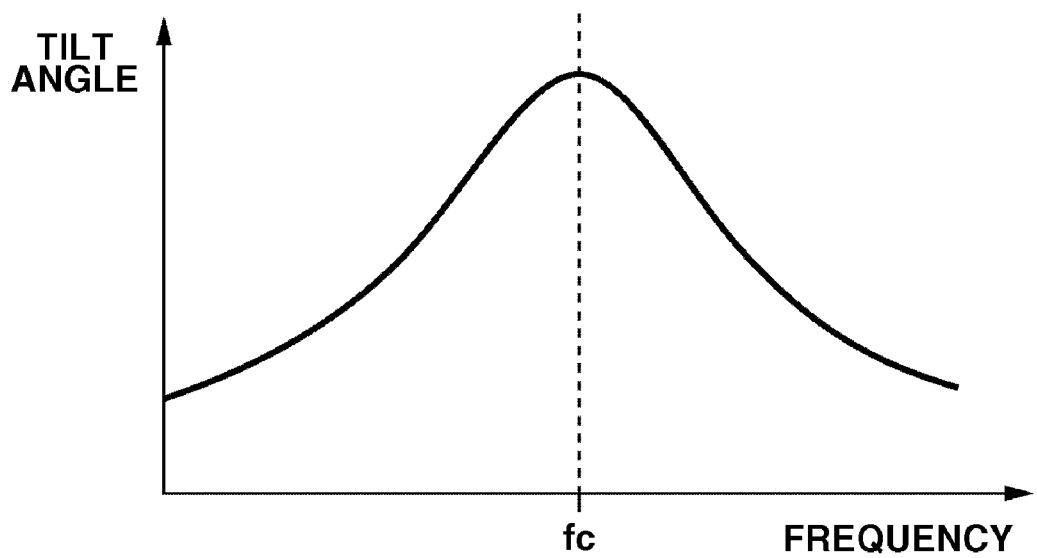
FIGS. 2A and 2B are graphs for explaining characteristics of a deflector driven in a resonance mode.
Figure 2B:
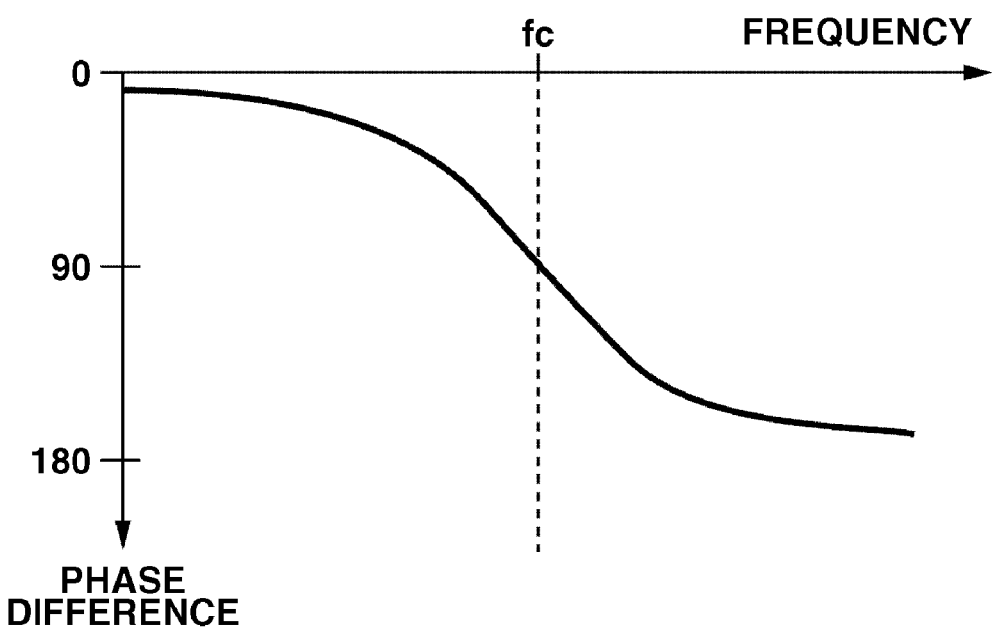

FIGS. 2A and 2B show characteristics of the deflector 102 driven in an example resonance mode. Abscissas of FIGS. 2A and 2B indicate the frequency of the driving signal 203 to be supplied to the deflector 102, the ordinate of FIG. 2A indicates the maximum tilt angle or amplitude of the deflector 102, and the ordinate of FIG. 2B indicates the phase difference of the deflector 102. The phase difference is referred to as a shift in phase of the vibration of the deflector 102 relative to the driving signal 203. As can be seen from FIGS. 2A and 2B, the amplitude is maximum at the resonance frequency fc, and a changing ratio of the phase difference is also maximum at the resonance frequency fc.

An index representing the efficiency of a resonance is called a quality value (Q). As the Q increases, the vibration of the vibrational system of the deflector 102 can be executed with less supply energy. Further, because the response to signals at frequencies other than the resonance frequency fc decreases as the Q increases, the vibration of the vibrational system of the deflector 102 can be more easily maintained under a stable condition when the Q is large. In contrast therewith, as the Q increases, the amplitude and the phase difference are likely to change more sensitively when the frequency of the vibration shifts from the resonance frequency fc. The resonance frequency fc sensitively varies due to a change in the environment, such as temperature.

The operation of a structure including only the light source 101 and the deflector 102 will be described. As the Q of the vibrational system of the deflector 102 increases, the response of the vibration of the vibrational system to a change in the driving signal 203 decreases. Therefore, when the driving signal 203 is changed, it takes a relatively long time to correct the vibration condition of the deflector 102 when the Q is large.

As described above, when an environmental change or a generation of considerable heat in the deflector 102 occurs, the vibration of the deflector 102 under the resonance condition varies largely. Accordingly, the driving signal 203 needs to be changed to correct the vibration condition of the deflector 102.

The change in the vibration condition with time due to environmental change is relatively moderate. Therefore, such change can be compensated for by changing the driving signal 203, and the vibration of the deflector 102 can be well maintained under a desired condition, keeping up with a speed of such a change.

However, a method of compensating for the change due to the heat generation in the deflector 102 can be as follows. Description will be made to a case where the optical deflector is used in an image forming apparatus. The amount of light impinging on the deflector 102 changes when the amount of light emitted from the light source 101 is regulated or modulated in accordance with the signal of a desired image (i.e., the modulation pattern signal 206 supplied to the light source 101). Accordingly, heat generation and the like occur in the deflector 102, and, thus, the temperature and the like locally vary. If the deflector 102 continues to be driven by an unchanging signal 203, the vibration condition of the deflector 102 is liable to change corresponding to the change in the image signal (the modulation pattern signal 206). As a result, the image formed in the image forming apparatus is lowered in quality due to the change in the vibration condition of the deflector 102.

In such a case, if only the driving signal 203 is changed for the purpose of reducing the change in the vibration condition of the deflector 102, the correction of the motion of the deflector 102 cannot keep up with a fast change in the image signal since this correction is slow in pursuing the change in the driving signal 203. Thus, the quality of the image formed cannot be improved satisfactorily.

In the present invention including this embodiment, both of (1) a relatively long-period change in the vibration condition of the deflector 102 due to the environmental change, and (2) a relatively short-period change in the vibration condition of the deflector 102 due to the change in the image data or the like are compensated for by different methods. The first change is compensated for by a method of detecting the vibration condition of the deflector 102, and regulating the driving signal 203 based on the detected information. The second change is compensated for by a method of detecting the condition of the light deflection, and regulating the modulation timing signal 204 supplied to the light source 101, based on the detected information. In other words, the first long-period change in the light deflection is compensated for by changing the vibration condition of the deflector with the driving signal generator. The second short-period change in the light deflection is compensated for by changing the emission condition of the light source with the modulation timing signal generator.

The vibration detector 103 and the driving signal generator 104 in connection with the compensation of the first change will now be described. The vibration detector 103 detects the vibration condition of the deflector 102, and supplies the detection signal 202 representative of information of the vibration condition to the driving signal generator 104. The vibration detector 103 can be composed of any device so long as it can monitor the vibration condition. Sensors of an electromagnetic type, an electrostatic capacity type, and a piezoelectric type built in the deflector 102 can be used. The vibration detector 103 is preferably one that can detect the reciprocating vibration of the deflector 102 in a sine-wave manner. In such a case, a sensor built in the deflector vibrating in a sine-wave manner continuously generates a signal corresponding to the tilt angle of the deflector. Hence, the signal from the sensor is in a sinusoidal waveform. Such a construction that detects the vibration of the deflector 102 in the sine-wave manner can be preferably used in case using a self-excited oscillator, as described below.

In the case of the piezoelectric sensor, the vibration detector can be composed of piezoresistance. To detect the tilt angle of the movable body by the piezoresistance, the piezoresistance is formed, for example, in the torsion spring and the timing of a certain tilt angle of the movable body is obtained based on a signal output from the piezoresistance. The piezoresistance can be formed, for example, by diffusing phosphorus into a single crystal of p-type silicon. When a constant current is caused to flow in the piezoresistance, a voltage signal is output according to a twisting angle of the torsion spring. Therefore, when the tilt angle of the movable body is measured, plural piezoresistances are formed in plural torsion springs. In such a structure, the tilt angle of the movable body can be precisely measured based on information of twisting angles of the plural torsion springs.

The driving signal generator 104 receives the detection signal 202 of the vibration condition, and generates the driving signal 203 based thereon. The driving signal generator 104 changes the frequency or the like of the driving signal 203 such that the vibration of the deflector 102 is maintained under a target condition.

More specifically, the frequency of the driving signal 203 is changed to shift the vibration condition of the deflector 102 to a resonance condition, or a certain condition close to a resonance condition. The amplitude of the driving signal 203 is then changed such that the amplitude of the vibration is a predetermined magnitude. Upon repetition of those changes, the vibration of the deflector 102 is maintained under the target condition.

As a method of bringing the vibration condition into a resonance condition, or a condition close to a resonance condition, there is a method of monitoring the amplitude of the vibration, and a method of monitoring the phase of the vibration. These methods make use of the characteristics shown in FIGS. 2A and 2B.

In a method of monitoring the amplitude of the vibration, the frequency of the driving signal 203 is changed to maximize the amplitude of the vibration. For example, when the amplitude is found to increase upon a little increase in the frequency of the driving signal 203, the increase in the frequency is further advanced. When the amplitude is found to decrease upon a little increase of the frequency of the driving signal 203, the frequency is reduced in turn. Such steps are repeated to find a frequency at which the amplitude is maximized (see FIG. 2A).

A method of monitoring the phase of the vibration is performed as follows. Under the resonance condition of the deflector 102, the phase of the vibration deviates 90 degrees from the phase of the waveform for supplying driving energy. The phase difference between the driving energy waveform and the vibrational tilt angle in the resonance mode is 90 degrees as illustrated in FIG. 2B. The sign of the phase difference depends on the waveform and the defined direction of the tilt angle. Actually, the phase difference between the driving signal 203 and the signal 202 representative of the vibration deviates from 90 degrees due to a delay appearing in the circuit, and the like. Accordingly, the frequency of the driving signal 203 is changed, considering such circuit delay, such that the phase difference between the driving signal 203 and the signal 202 representative of the vibration reaches a certain target magnitude. The deflector 102 can be thus maintained under a resonance condition, or a condition close to a resonance condition.

The compensation of the above-described first change by the vibration detector 103 and the driving signal generator 104 can be conducted, for example, at the start of operating the apparatus, or, as another example, periodically during the operation of the apparatus. This compensation can be executed, for example, when the amplitude of the vibration becomes lower than a threshold magnitude. Alternatively, it is possible to adopt a method in which a thermometer is provided in the apparatus so that the compensation is conducted when the thermometer detects a temperature change larger than a predetermined magnitude.

The deflection detector 106 and the MTS generator 105 in connection with the compensation of the above second change will now be described. As described above, the MTS generator 105 generates the modulation timing signal 204 as the reference time for regulating or modulating the amount of light emitted by the light source 101, and supplies the modulation timing signal 204 to the light source 101. The modulation timing signal 204 is generated based on the detection signal 205 representative of the deflection condition of the deflected light deflected by deflection of the light 201 from the light source 101.

For example, where the optical deflector is used in the image forming apparatus, it is difficult to form a high-quality image by controlling only the vibration condition with the driving signal generator 104, as described above. Reasons for this include (1) the precision in detecting the vibration condition of the deflector 102 cannot be increased, and (2) the image formed does not completely correspond to the vibration of the deflector 102 due to delays of the driving signal, the modulation of the light source, and the like.

Figure 3A:
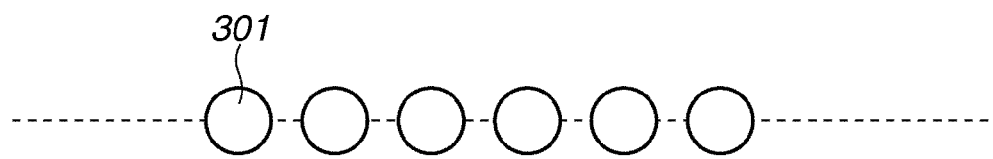
FIGS. 3A to 3D are views for explaining deflected light modulated according to a modulation signal and scanned on a certain surface.
Figure 3B:
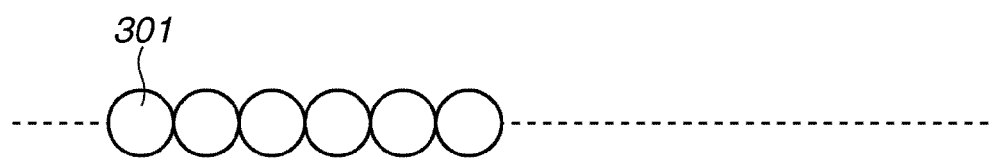

FIGS. 3A to 3D illustrate light modulated according to a given modulation signal 206 and scanned on a certain scan surface. It is assumed that deflected light 301 illustrated in FIG. 3A will be imaged along a single scanning direction. Actually, however, the relationship between the direction of the light deflection and the modulation timing of the light source 101 is liable to shift from a desired one. Due to such shift, the deflected light 301 from the light source deviates from a desired position (a desired tilt angle), as illustrated in FIG. 3B. Thus, the pattern of the image formed shifts from a target image formation position.

Figure 3C:
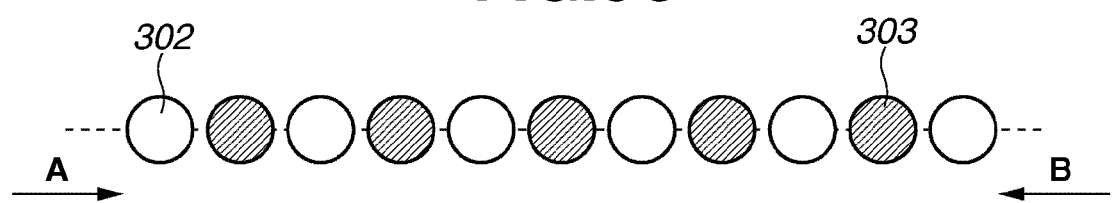
Figure 3D:
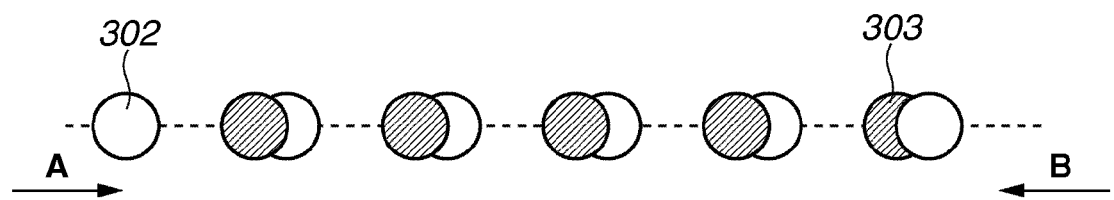

When both forward and backward movements of the reciprocating vibration of the deflector 102 are used for forming the image, the above shift becomes larger. This is because images formed in the forward and backward movements shift in opposite directions, and the resultant shift is doubled. For example, where a desired light deflection should be performed as illustrated in FIG. 3C, the light deflection as illustrated in FIG. 3D appears due to the above-described shift. In FIGS. 3C and 3D, reference numeral 302 designates deflected light scanned in a direction A, and reference numeral 303 designates deflected light scanned in a direction B.

In this embodiment, to solve the above-described disadvantage, the MTS generator 105 generates the modulation timing signal 204 based on the detection signal 205 representative of the deflection condition of the deflected light deflected by deflection of the light 201 from the light source 101, and thereby executes a correction. Specifically, the modulation timing of the light source 101 is corrected in accordance with the deflection condition of the deflected light, by shifting the modulation timing signal 204 along the time axis. The MTS generator 105 is adapted to generate the modulation timing signal such that the deflected light can be brought into a target deflection condition.

A device for optically detecting the deflection condition can be used as the detector for detecting the deflection condition (see a third embodiment described below). For example, photo-detector, Position Sensitive Detector (PSD), image sensor, or the like can be employed.

The deflection detector 106 can precisely detect the deflection condition of the deflected light since it directly detects the deflection condition. In other words, the deflection detector 106 detects the position of the deflected light, but not the vibration condition of the deflector 102, so that disadvantages, such as the decrease in preciseness due to the signal response, do not occur. In addition, the deflection detector 106 detects the deflection condition that is a result containing the decrease in preciseness occurring in detecting the vibration condition, the delay in the driving signal, the delay in the modulation of the light source, and the like. Accordingly, the deflection detector 106 can detect the resultant condition without erroneous factors, and thereby achieve a highly precise detection.

Further, since a correction is executed through the modulation timing of the light source 101, the deflection condition can be finely corrected. It is also possible to perform a real-time correction since the correction is executed through the modulation timing of the light source 101, but not the vibration condition of the deflector 102 driven by the driving signal generator 104.

In this embodiment, it is possible to quickly compensate for the fluctuation of the relatively short-period deflection condition due to the change in the image data, and appropriately maintain a desired deflection condition.

The compensation of the above-described second change by the deflection detector 106 and the MTS generator can be executed, for example, every time or intermittently when the reciprocating deflected light turns its direction of scanning movement. Typically, considering the properties of the above first and second changes, the time interval at which the driving signal generator 104 renews or corrects the driving signal is set longer than the time interval at which the MTS generator 105 renews or corrects the modulation timing signal.

According to the first embodiment, the above-described first and second changes are both compensated for, and the light deflection can be quickly and stably maintained under a target condition.

In the above-described construction of this embodiment, the self-excited oscillator can be used as the driving signal generator 104. In the self-excited oscillator, the detection signal 202, representative of the vibration condition of the deflector 102, is positively fed back by using an operational amplifier and the like, and, thus, the driving signal 203 is generated. The self-excited oscillator can automatically regulate the driving signal 203 such that the amplitude of the detection signal 202 is maximized. Therefore, it is strongly resistant to external noise and can stably maintain the deflector 102 under a resonance condition or a condition close to a resonance condition.

Further, the self-excited oscillator can be composed of a simple structure including a chief operational amplifier. When the self-excited oscillator is used to drive the deflector 102 in the resonance mode, the deflector 102 can be used as an oscillator. Accordingly, there is no need to additionally provide a frequency generator, and, hence, the driving signal generator 104 can be composed of a small number of components. In this construction, the vibration detector 103 is preferably a detector that can detect the reciprocating vibration of the deflector 102 in a sine-wave manner.

As described above, in the case using the self-excited oscillator, a stable driving signal generator 104 can be composed of a small number of components, and therefore stable and precise light deflection can be achieved by the optical deflector having a simple construction.

A second embodiment will now be described. An optical deflector of this embodiment has a unique MTS generator 105 described as follows. With respect to other points, this embodiment is the same as the first embodiment.

In this embodiment, the MTS generator 105 generates the modulation timing signal 204 by using a signal in synchronization with the driving signal 203. The MTS generator 105 generates the modulation timing signal 204 by using a signal that is created by multiplying a synchronous signal of the driving signal 203.

Figure 4:
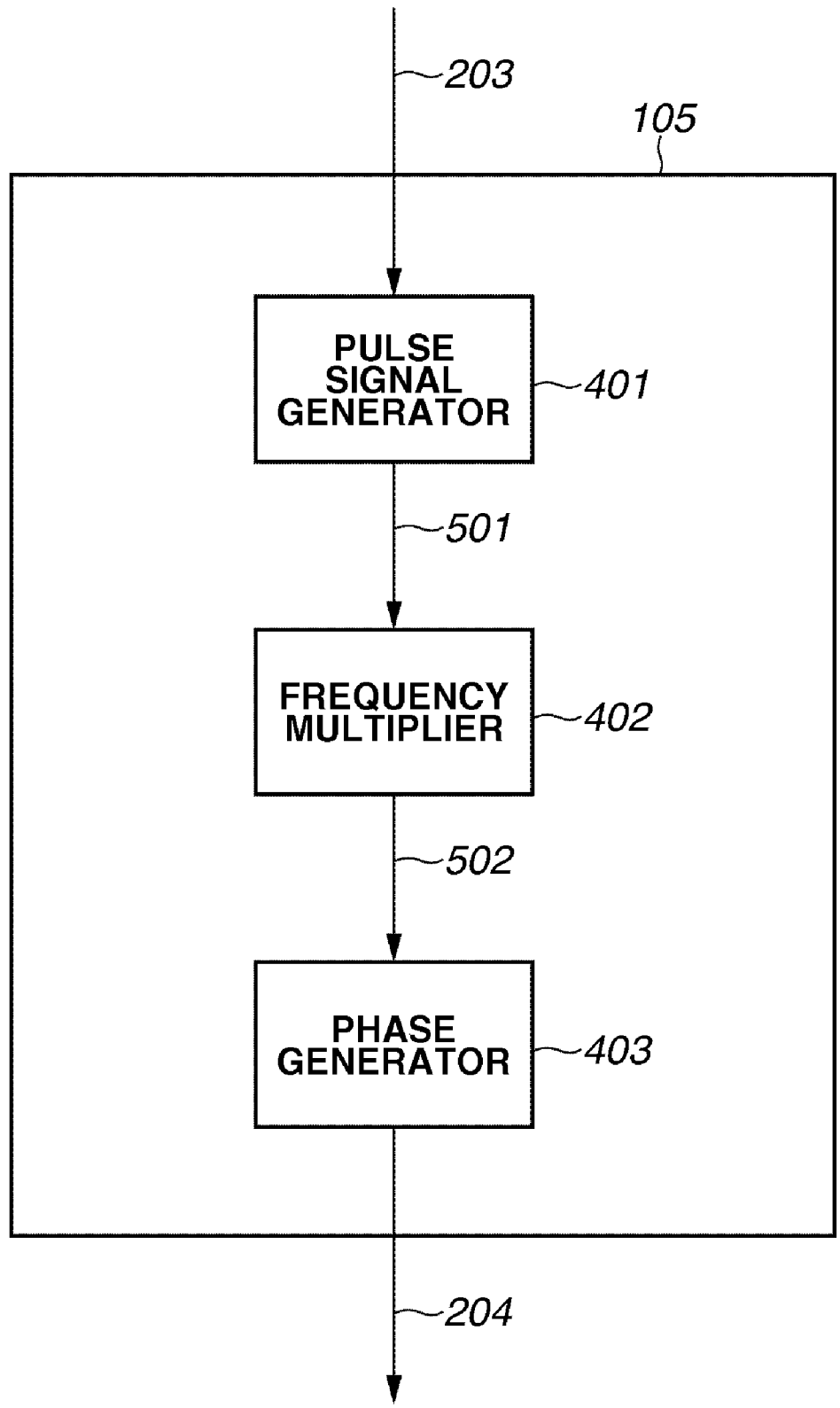
FIG. 4 is a view illustrating the setup of an MTS generator of an optical deflector of a second embodiment according to the present invention.

FIG. 4 illustrates the structure of the MTS generator 105 of this embodiment. In FIG. 4, reference numeral 401 designates a pulse signal generator, reference numeral 402 designates a frequency multiplier, and reference numeral 403 designates a phase generator. Further, reference numeral 501 designates a pulse signal, and reference numeral 502 designates a synthesized signal. FIGS. 5A to 5E illustrate signals in connection with the MTS generator 105 in this embodiment, respectively. In FIGS. 5A to 5E, abscissa indicates the time, and ordinate indicates the magnitude of the signal.

Figure 5A:
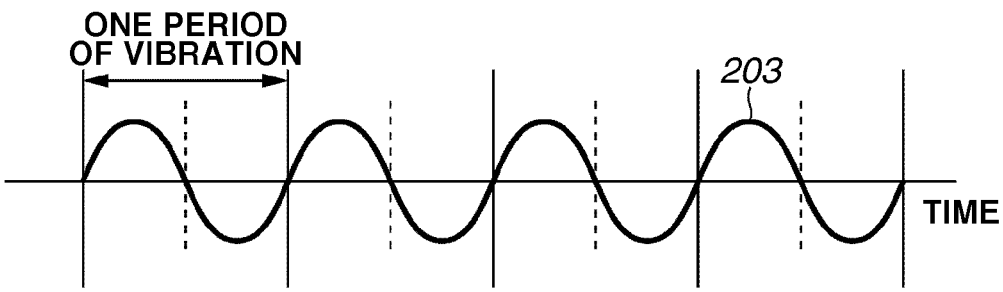
FIGS. 5A to 5E are views explaining signals in connection with the MTS generator in the second embodiment.
Figure 5B:
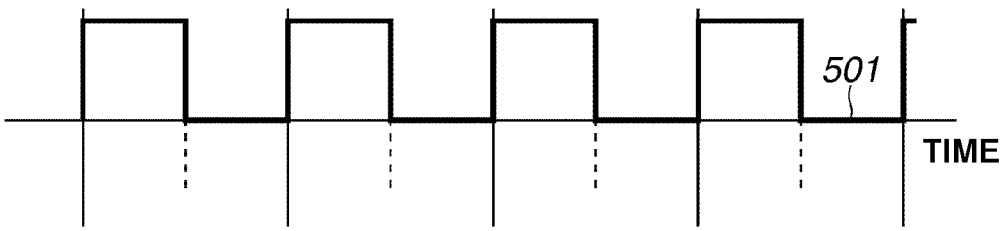

The pulse signal generator 401 generates the pulse signal 501 from the driving signal 203 for the deflector 102. For example, when the driving signal 203 is one as illustrated in FIG. 5A, the pulse signal 501 as illustrated in FIG. 5B is generated. The frequency of the pulse signal 501 is equal to the frequency of the driving signal 203. The duty is 50 percent in FIG. 5B, but the duty is not limited to this percentage.

Figure 5C:
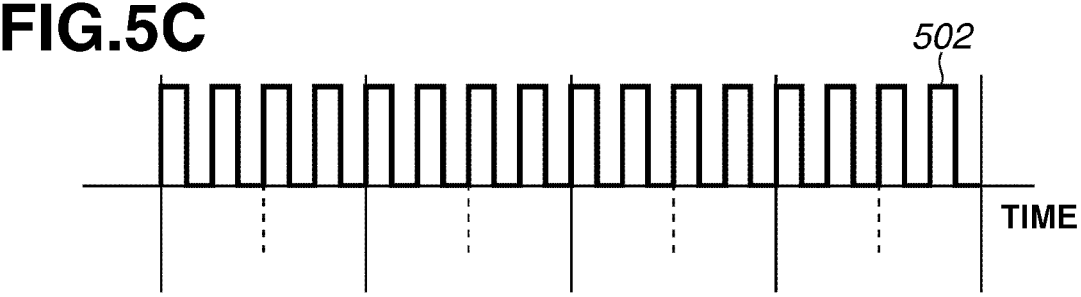

The pulse signal 501 is converted into the synthesized signal 502 with an n-fold frequency of the pulse signal 501 by the frequency multiplier 402. The synthesized signal 502 generated from the pulse signal 501 of FIG. 5B is illustrated in FIG. 5C. In FIG. 5C, an example of a doubled frequency is illustrated, but actually the synthesized signal 502 with a several hundred-fold frequency to several tens thousand-fold frequency can be used.

Figure 5D:
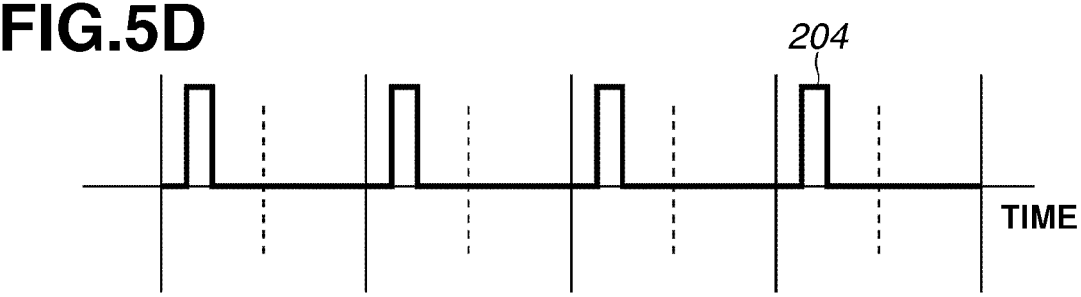
Figure 5E:
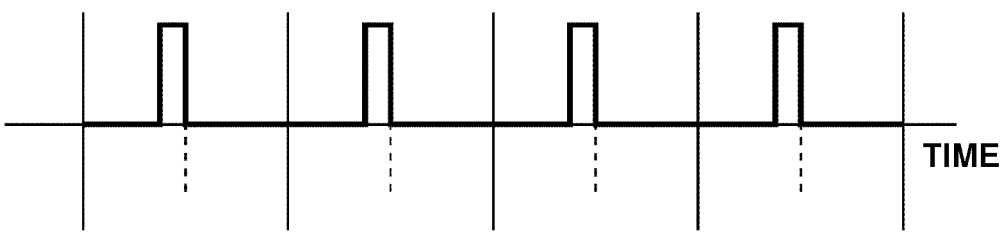

The synthesized signal 502 is converted into the modulation timing signal 204 based on the signal representative of deflection condition, as illustrated in FIG. 5D. The modulation timing signal 204 has a certain phase (an index of time shift in a period of the driving signal 203) relative to the driving signal 203 supplied to the deflector 102. The signal 205 representative of the deflection condition is input into the MTS generator 105 without any direct relation with the driving signal 203. The phase of the modulation timing signal 204 is regulated (see FIG. 5E, for example) such that the modulation timing of the light source 101 can be regulated in accordance with the phase of the vibration of the deflector 102. Thus, the deflection condition of the deflected light can be regulated. Specifically, the phase of the modulation timing signal 204 for the light source 101 is delayed or advanced to achieve the regulation for a desired light deflection.

The modulation timing signal 204 can be readily generated by a construction in which the synthesized signal 502 is counted, and a signal is generated at the time of a certain given count number. The construction can be composed of a digital circuit (a logic integrated circuit (IC)), such as field programmable gate array (FPGA), and programmable logic device (PLD). The modulation timing can be precisely regulated by a unit of the period of the synthesized signal 502.

The synthesized signal 502 can be used as the reference signal for modulating the light source 101 during operation of the apparatus. Specifically, the amount of light emitted from the light source 101 can be modulated at a rise or decay of the synthesized signal 502 according to the modulation pattern signal. The modulation timing signal 204 can be synchronized with the driving signal 203 for the deflector 102. Accordingly, when the deflection condition of the deflected light is unchanged, desired light impingement on the same deflection position can be achieved for every reciprocating motion of the deflected light. Here, "synchronization" means that a ratio between frequencies of repetitive signals is an integer.

According to this embodiment, it is possible to achieve an optical deflector capable of precisely and stably regulating the deflection condition of the deflected light.

A third embodiment will now be described. An optical deflector of this embodiment includes the following deflection detector for generating the detection signal 205 representative of the deflection condition of the deflected light. With respect to other points, this embodiment is the same as the first or second embodiments.

The deflection detector 106 in this embodiment measures the distance between a position of the deflected light moving on a light receiving device in a direction and a position of the deflected light moving on the light receiving device in the opposite direction, and outputs the measurement signal as the detection signal 205 representative of the deflection condition. The MTS generator 105 receiving the detection signal 205 generates the modulation timing signal 204 such that the above distance can be adjusted to be a predetermined magnitude.

Figure 6:
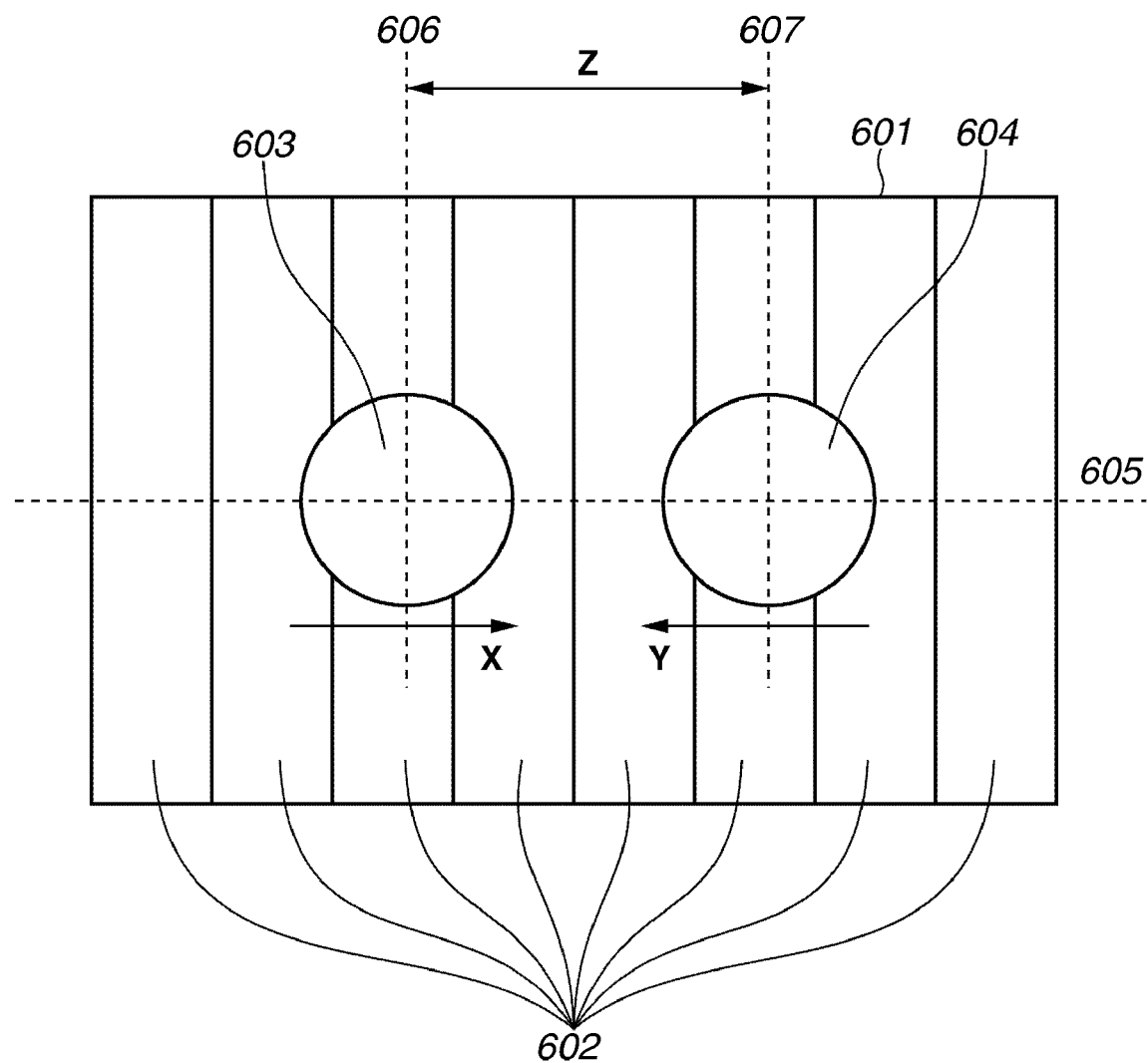
FIG. 6 is a view illustrating the construction of a deflection detector of an optical deflector of a third embodiment according to the present invention.

FIG. 6 is a schematic view explaining the detection of the deflection condition in this embodiment. In FIG. 6, reference numeral 601 designates the light receiving device, and reference numeral 602 designates a stripe-shaped light receiving region. Further, reference numerals 603 and 604 designate the deflected light, reference numeral 605 designates a deflection trace formed by a center of the deflected light in its longitudinal direction, reference numeral 606 designates a center of the deflected light 603 in its transverse direction, and reference numeral 607 designates a center of the deflected light 604 in its transverse direction.

The light receiving device 601 is composed of a plurality of light receiving regions 602. As illustrated in FIG. 6, the light receiving device 601 measures the position of the deflected light 603 moving in the direction X, and the position of the deflected light 604 moving in the opposite direction Y. In a method of detecting the positions of the deflected light 603 and 604, the light source 101 is modulated, or turned ON and OFF, and a light spot is formed on the light receiving device 601. The position of the light spot on the light receiving device 601 is calculated based on signals from the plural light receiving regions 602 of the light receiving device 601 and the arrangement of the light receiving regions 602. Therefore, the two positions 606 and 607 can be measured and the distance Z between these positions can be obtained. The obtained distance Z is used as the signal 205 representative of the deflection condition of the deflected light. The deflection condition can be detected directly from the positional information by the above-described method. Accordingly, the deflection condition can be acquired precisely.

The MTS generator 105 generates the modulation timing signal 204 based on the amount of deviation of the measured distance Z from a target distance. It is possible to calculate a shift of the modulation timing signal 204 for compensating for the deviation amount from the target distance, based on data prepared and stored in the MTS generator 105.

According to this embodiment, because the deflection condition can be precisely detected, it is possible to achieve an optical deflector capable of precisely and stably regulating the deflection condition of the deflected light.

The optical deflector described above can be used in an optical instrument, such as an image forming apparatus. In such an image forming apparatus, even if an environmental change or a change in the image signal occurs, the influence is little and a high-quality image can be formed.

Figure 7:
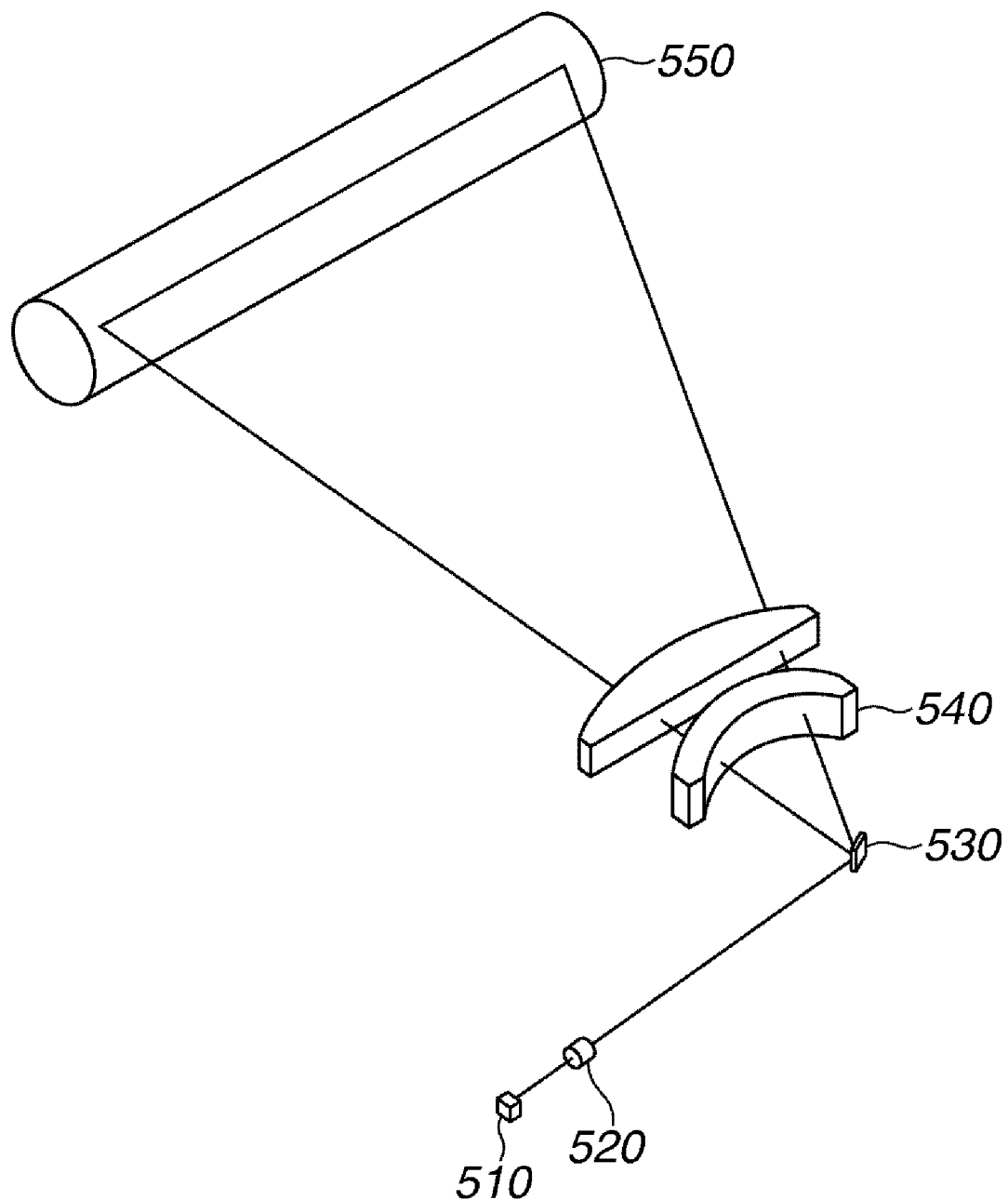
FIG. 7 is a view illustrating the setup of an image forming apparatus of a fourth embodiment according to the present invention.
Figure 8:
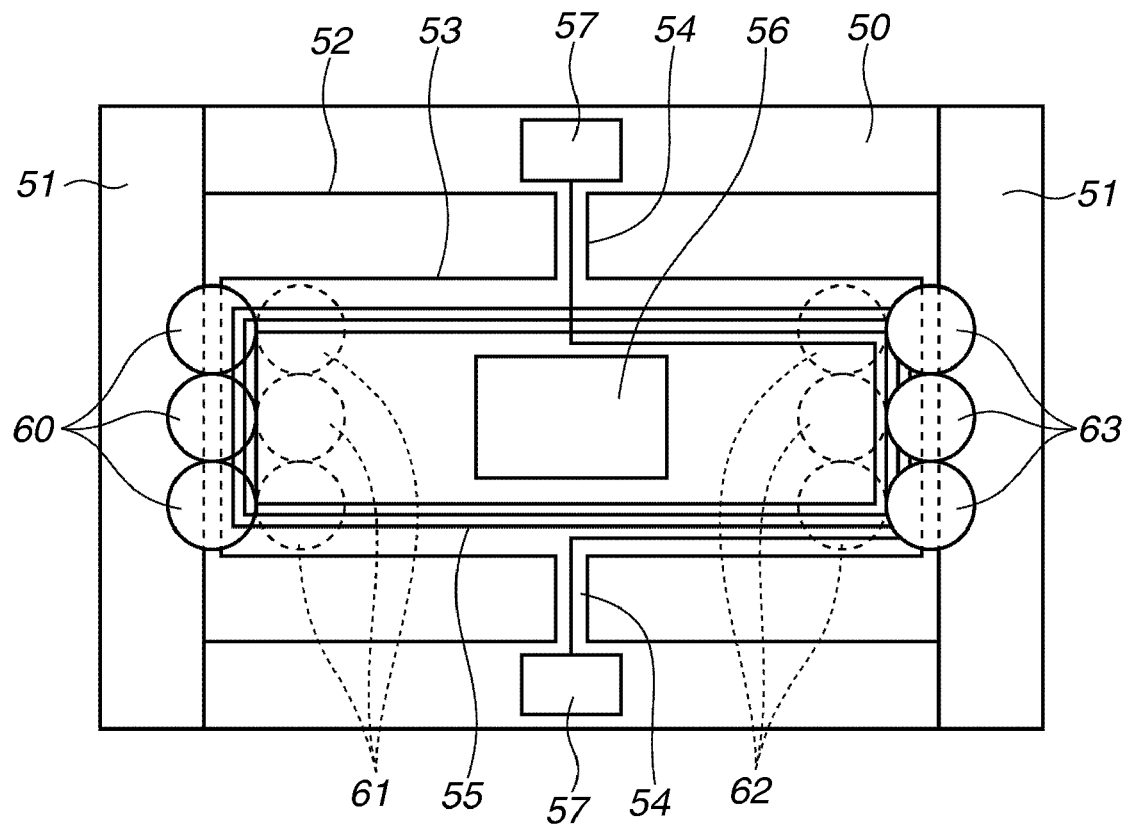
FIG. 8 is a view illustrating a conventional galvano-mirror acting as an optical deflector.

FIG. 7 illustrates an image forming apparatus according to a fourth embodiment of the present invention. A light reflective surface is formed on the movable body of the vibrational system in an optical deflector 530 in this embodiment. Light from a light source 510 is appropriately shaped by a collimator lens 520, and then deflected and scanned by the optical deflector 530. The deflected light is imaged on a drum-shaped photosensitive body 550 through a coupling lens 540, and the photosensitive body 550 is exposed to light. When the light from the light source 510 is modulated, an electrostatic latent image corresponding to the modulation signal is formed on the photosensitive body 550.

The photosensitive body 550 rotating about a rotary center axis in a direction perpendicular to the light scanning direction is uniformly charged by a charger (not shown). When the light is scanned on the charged photosensitive body 550, an electrostatic latent image is formed on the scanned portion thereof. A toner image is then formed by a developer (not shown), corresponding to the latent image on the photosensitive body 550. A visible image can be formed, for example, on a paper (not shown) by transfer and fixation.

In the image forming apparatus of this embodiment using the optical deflector 530 capable of achieving precise and stable light deflection, light scanning characteristics are improved, and a clear and precise image can be formed.

The optical deflector of the present invention can also be used in an image displaying apparatus in which a light beam from a light source is deflected by a light deflecting element on the movable body of the optical deflector. At least a portion of the light deflected by the optical deflector is impinged on an image display body.

Thus, in the optical instrument, such as image forming apparatus and image displaying apparatus, there are arranged the optical deflector of the present invention, the light source, and the light-impinging target body, and the light deflected by the optical deflector is impinged on the target body. Image data for regulating the amount of light from the light source is synchronized with the modulation timing signal, and the thus-modulated light forms the image on the target object. Where the deflector of the optical deflector has two characteristic vibrational modes about different axes, light from the light source can be deflected and scanned in a two-dimensional manner to form a two-dimensional image on the image display body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application Nos. 2007-163235, filed Jun. 21, 2007, and 2008-108614, filed Apr. 18, 2008, which are hereby incorporated by reference herein in their entirety.

What is claimed is:

1. An optical deflector comprising:
   a deflector including a vibrational system having a movably supported body with a light deflecting member, the deflector deflecting light from a light source;
   a vibration detector configured to detect tilt angles of the movably supported body of the vibrational system of the deflector throughout reciprocating movement of the movably supported body;
   a driving signal generator configured to generate a driving signal for driving the vibrational system of the deflector;
   a modulation timing signal generator configured to generate a modulation timing signal for regulating timing for modulating the amount of light from the light source; and
   a deflection detector configured to detect a deflection condition of light from the light source deflected with the deflector,
   wherein the driving signal generator generates the driving signal based on information of the tilt angles detected by the vibration detector, and
   wherein the modulation timing signal generator generates the modulation timing signal based on information of the deflection condition detected by the deflection detector.

2. An optical deflector according to claim 1, wherein a time interval at which the driving signal generator renews the driving signal is set longer than a time interval at which the modulation timing signal generator renews the modulation timing signal.

3. An optical deflector according to claim 1, wherein the vibration detector continuously detects reciprocating vibration of the movably supported body and outputs a signal having a waveform of a sine wave, and the deflection detector optically detects the deflection condition of the deflected light.

4. An optical deflector according to claim 3, wherein the vibration detector comprises one of sensors of an electromagnetic type, sensors of an electrostatic capacity type, and sensors of a piezoelectric type built in the deflector, and the deflection detector comprises one of a photo-detector, a Position Sensitive Detector, and an image sensor.

5. An optical deflector according to claim 1, wherein the driving signal generator is adapted to change a frequency of the driving signal such that the deflector can be brought into a target vibration condition.

6. An optical deflector according to claim 5, wherein the driving signal generator includes a self-excited oscillator, and the deflector is driven in a resonance mode.

7. An optical deflector according to claim 1, wherein the modulation timing signal generator is adapted to generate the modulation timing signal such that the deflected light can be brought into a target deflection condition.

8. An optical deflector according to claim 1, wherein the modulation timing signal generator is adapted to generate the modulation timing signal by using a signal created by multiplying a synchronous signal of the driving signal.

9. An optical deflector according to claim 1, wherein the deflection detector is adapted to measure a distance between a position of the deflected light moving on a light receiving device in a first direction and a position of the deflected light moving on the light receiving device in a second direction opposite to the first direction, and the modulation timing signal generator is adapted to generate the modulation timing signal such that the distance can reach a predetermined magnitude.

10. An optical instrument comprising:
    the optical deflector recited in claim 1;
    a light source; and
    a target object,
    wherein the optical deflector deflects light from the light source, and guides at least a portion of the light onto the target object, and an image is formed on the target object with the guided light while image data for regulating the amount of light from the light source is synchronized with the modulation timing signal.

* * * * *